Aug. 18, 1964   H. C. FRENCH ETAL   3,145,009
CONTAINERS FOR VEHICLES
Filed Aug. 8, 1960   4 Sheets-Sheet 1
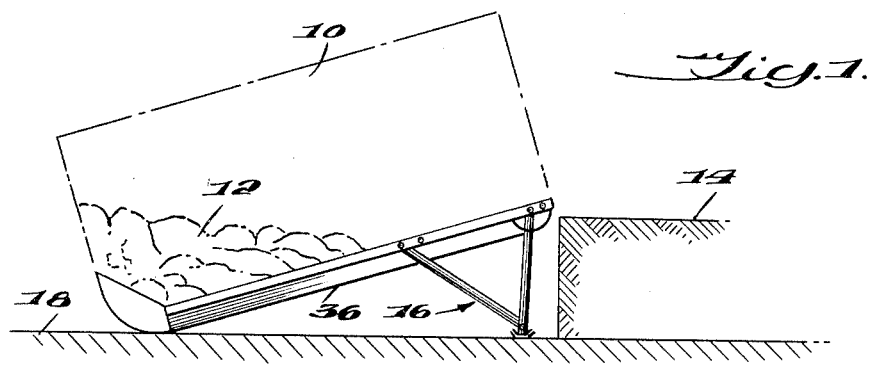
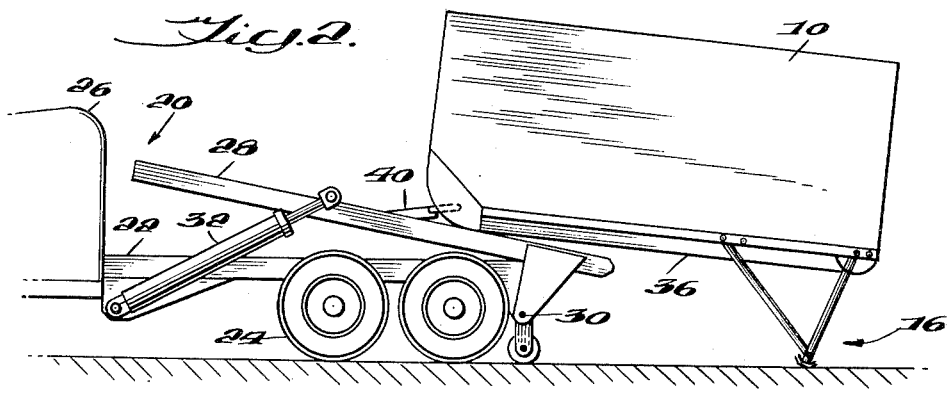
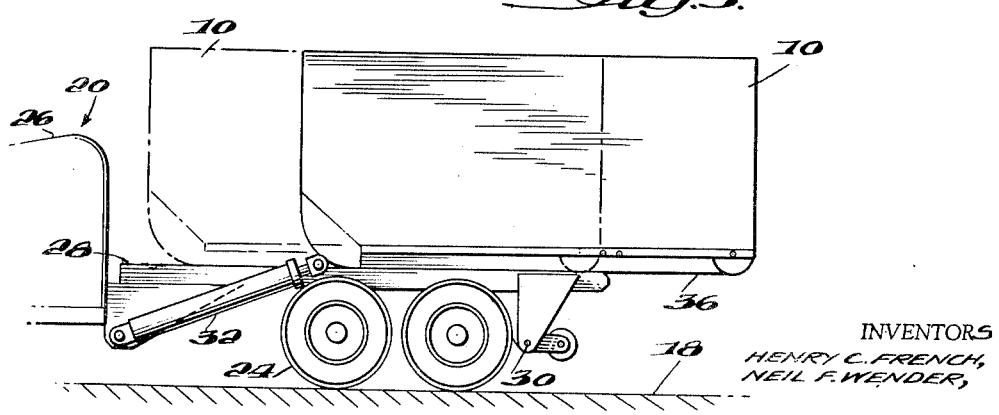
INVENTORS
HENRY C. FRENCH,
NEIL F. WENDER,
BY
ATTORNEYS Aug. 18, 1964  H. C. FRENCH ETAL  3,145,009
CONTAINERS FOR VEHICLES
Filed Aug. 8, 1960  4 Sheets-Sheet 2
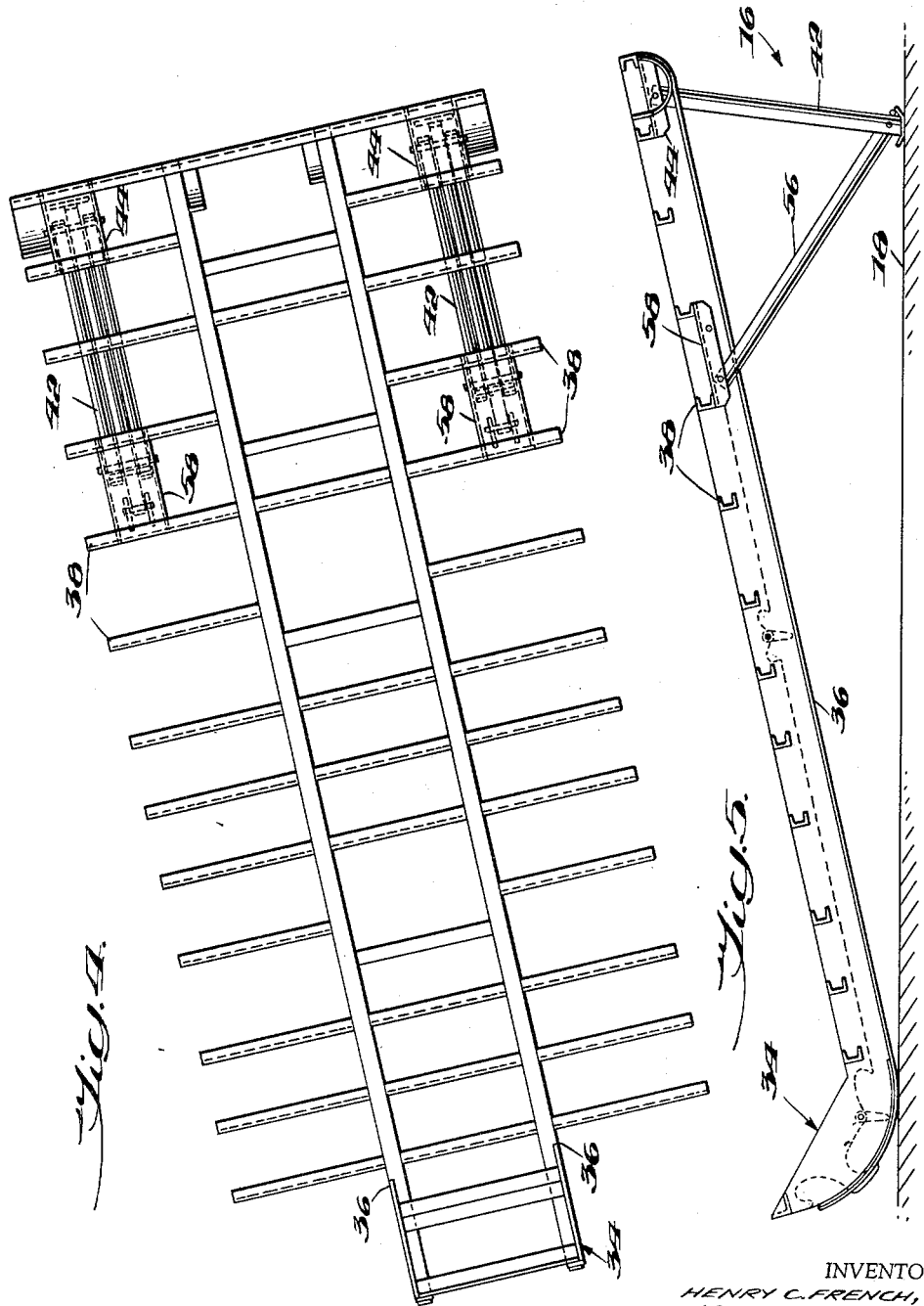
INVENTORS
HENRY C. FRENCH,
NEIL F. WENDER,
BY
ATTORNEYS

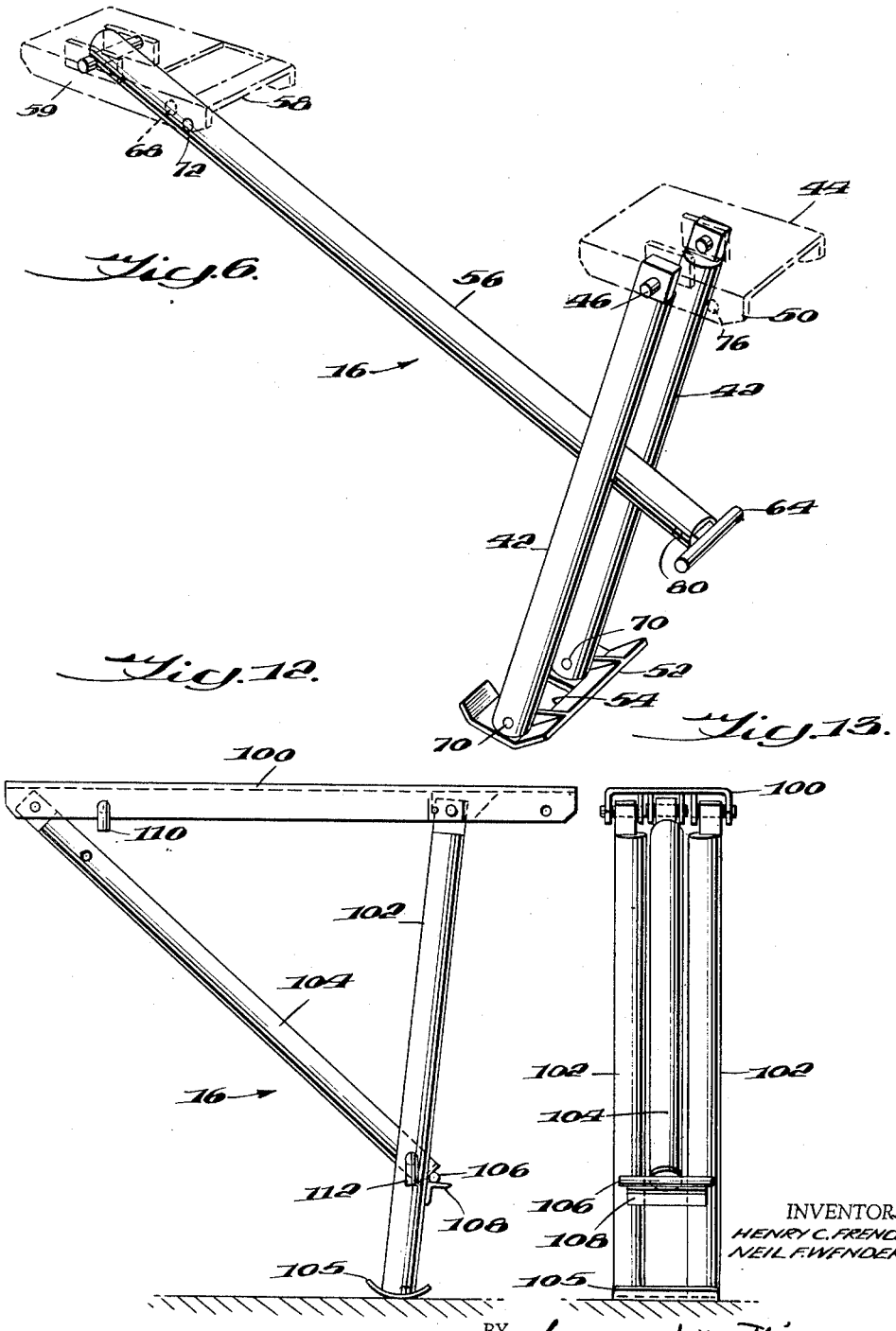

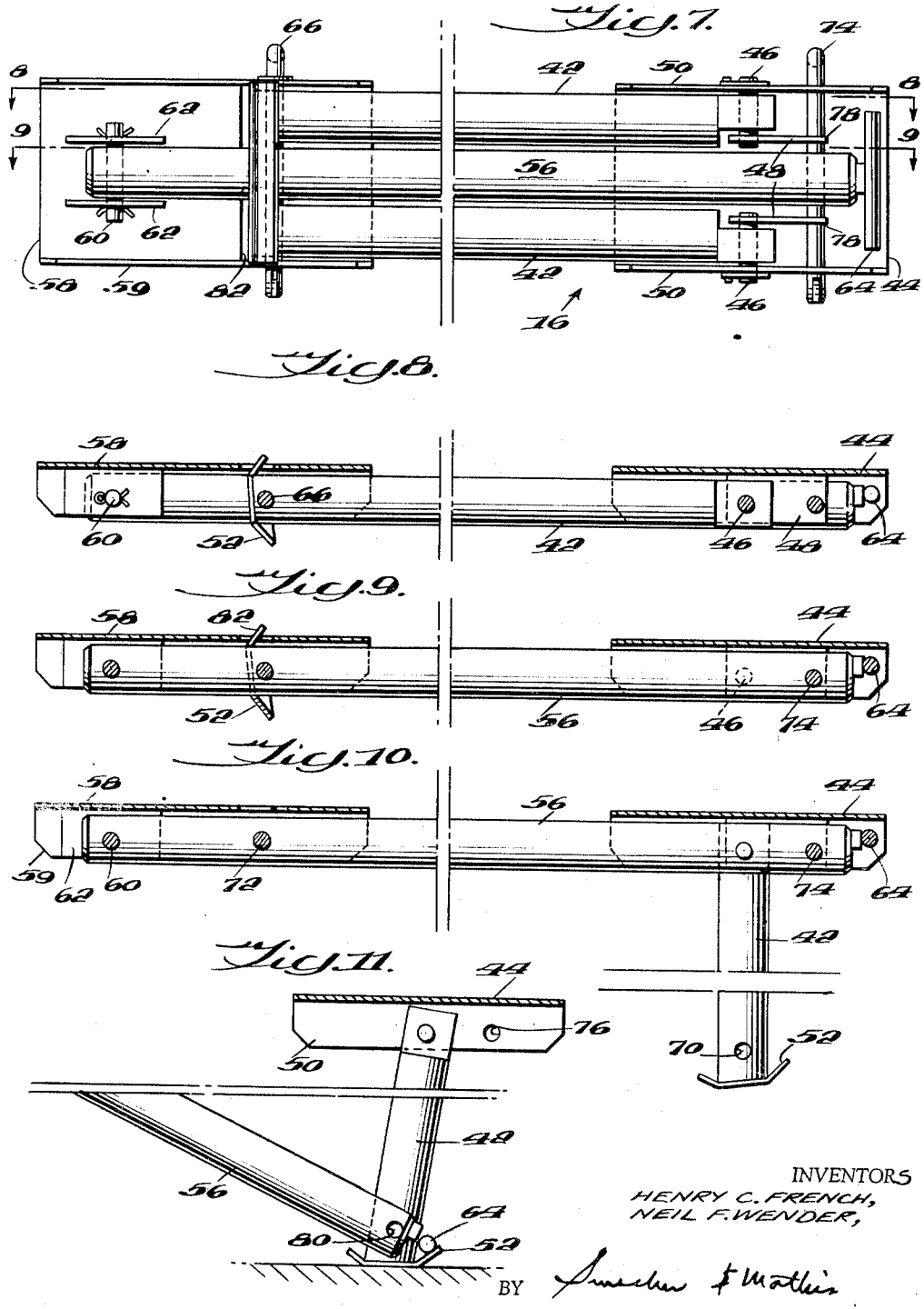

United States Patent Office 3,145,009
Patented Aug. 18, 1964

3,145,009
CONTAINERS FOR VEHICLES
Henry C. French and Neil F. Wender, Knoxville, Tenn.,
assignors to Dempster Brothers, Inc., Knoxville, Tenn.,
a corporation of Tennessee
Filed Aug. 8, 1960, Ser. No. 48,274
2 Claims. (Cl. 248—150)

This invention relates to containers for vehicles, and more particularly to containers of the order of vehicle bodies which may be loaded onto and removed from a transport vehicle.

It is often desirable to use large capacity containers for holding various types of lading and to provide for the loading and unloading of such containers with respect to a transporting vehicle. Such containers can be filled when sitting on the ground, floor or other surface, after which they can be picked up or loaded by a power device, transported to a remote point, and then unloaded from the vehicle. It is possible to fill the container when it is separate from the transporting vehicle, and then carry the container to a remote point and disconnect it from the vehicle while still full.

When using such containers in this manner, often they are located for filling at a loading dock, railway car, or similar type of raised platform. It is desirable and often necessary that one end of the container, usually the rear end, be supported in an elevated position so that it is at the approximate height of the loading dock or railway car.

A pair of supporting legs may be used at the one end of the container to keep it raised while the other end rests upon the ground. Several problems arise, however, when supporting legs are used for this purpose. Such legs are subjected to severe bending stresses when the container is loaded and unloaded. There is a minimum amount of space available for support legs because the bottom portion of the container must engage the loading and unloading mechanism on the transport vehicle.

One object of this invention is to improve the construction of containers for loading and unloading mechanism, to provide for supporting of one end of the containers or both ends of the containers in elevated positions in a practical and efficient manner.

Another object of the invention is to simplify and improve the provision of supporting legs for such a container to provide for supporting of at least one end of the container in an elevated position during loading and unloading of the container with respect to a transport vehicle without interference by the supporting legs with the loading and unloading mechanism.

Another object of the invention is to provide a pair of supporting legs which are rigid and strong and able to withstand horizontal as well as vertical loads and yet are easily extended and retracted.

These objects may be accomplished according to one embodiment of the invention, by constructing a body or detachable container with means for attachment to a transport vehicle to shift the container onto or off the vehicle, as desired. The container is provided with a plurality of supporting leg assemblies connected therewith, so as to support one end of the container or both ends in an elevated position when shifted off the transport vehicle.

Each leg assembly can be moved to an extended position or folded into a stored position, and each is comprised generally of a group of rigid leg members pivotally connected to the underside of the container. The leg members can be locked in the extended position to support the container. When in the stored position, the members interfit so as to require little space and not to interfere with the movement of the container onto or off of the transport vehicle.

In one embodiment, the group of leg members meet and are secured together at their extreme lower ends. In another embodiment, the free ends of certain leg members are secured to an intermediate section of the remaining members.

These embodiments of the invention are illustrated in the accompanying drawings, in which:

FIG. 1 is a side elevation view of a container located at a loading dock;

FIG. 2 and FIG. 3 are side elevation views of a container and a transport vehicle showing various stages of the loading or unloading of the container;

FIG. 4 is a plan view of the understructure of a container showing supporting legs attached thereto in the retracted position;

FIG. 5 is a side elevation view of the understructure with the legs in the extended position;

FIG. 6 is a perspective view of a supporting leg assembly with the connecting brackets shown in broken lines;

FIG. 7 is a bottom view of a supporting leg assembly;

FIG. 8 is a cross section view taken along line 8—8 in FIG. 7;

FIG. 9 is a cross section view taken along line 9—9 in FIG. 7;

FIG. 10 is a cross section view similar to FIG. 9, but showing one leg member in the extended position;

FIG. 11 is a fragmentary side elevation view of a supporting leg assembly;

FIG. 12 is a side elevation view of a modified supporting leg assembly; and

FIG. 13 is an end elevation view corresponding with FIG. 12.

In FIG. 1 there is shown a container 10, of the type with which the supporting legs of this invention may be used advantageously, partially filled with lading 12 and located adjacent a loading dock 14.

A pair of supporting leg assemblies 16 are attached to the rear of the container 10, and as shown in FIG. 1, are in an extended position so as to support the rear of the container at an elevation corresponding generally with the level of the dock 14, while the front part of the container 10 rests on the ground 18. When the container 10 is located in this position with respect to the dock 14, or other raised platform such as a railway car, it may be filled easily with lading, as desired.

When the container 10 is full, it can be loaded onto a vehicle and transported to a remote point and the contents thereof discharged, after which the container can be returned empty and unloaded from the vehicle, whereupon it may be filled again.

The transport vehicle 20 may be of conventional form and equipped with a chassis frame 22 supported by the usual wheels 24. The vehicle is power driven and self-propelled under the control of the operator who is located within the cab 26.

Mounted on the chassis frame 22 and extending lengthwise thereof is a tilting frame 28 pivotally supported at 30 on the chassis frame for tilting movement with respect thereto under control of hydraulic power devices 32.

The container 10 may be of any suitable size and character capable of being picked up on the transport vehicle 30 and capable of being pulled into carrying position. The container 10 is provided with an enclosure supported upon an understructure subframe 34 which comprises skid members 36, and a suitable type and number of cross brace members 38. Any means may be used for moving the container 10 lengthwise onto or off of the tilting frame 28, although we prefer to employ for this purpose a carriage structure including a bail 40 (FIG. 2) having detachable engagement with the subframe 34 of the container and being moved step-by-step lengthwise of the tilting frame 28 in either a forward or a rearward direction.

The foregoing structure is set forth more in detail in a companion application, Serial No. 106,427, filed April 20, 1961, to which reference is made for a more detailed explanation and disclosure of the structure employed for effecting the loading and unloading of the container with respect to the transport vehicle.

When it is desired to support the rear end of the container 10 in an elevated position, as for example besides the loading dock 14, the supporting leg assembly 16 may be employed. With reference to FIGS. 6–12, there is shown a supporting leg assembly 16 comprised of a pair of parallel rear leg members 42 pivotally connected at one of their ends to a rear bracket member 44 by means of pins 46 which are supported by depending plates 48 and the sides 50 of the bracket 44. At the other end of the leg members 42 there is a foot plate 52 which is U-shaped and open to the front, as indicated by the cut-out portion at 54.

A single or brace leg member 56 is pivotally connected at one end to a front bracket member 58, having sides 59, by means of a pin 60 which is supported by depending plates 62. The opposite end of the leg member 56 has fixed thereto a transversely extending stop pin 64 which is long enough to protrude across the pair of leg members 42 but short enough to fit between the sides 50 of the bracket 44 in folded relation, as shown in FIG. 7.

The two brackets 44 and 58 of each supporting leg assembly 16 are securely attached to various cross brace members 38 of the subframe 34, as by welding, so that the brackets 44 and 58 are longitudinally spaced with respect to the container 10, as shown in FIGS. 4 and 5.

When the container 10 is to be placed on the ground, or other surface, with the rear end not raised, the supporting leg assemblies 16 may be retained in a retracted position so that no part of the assemblies 16 extends below the bottom surface of the skid members 36 which will bear on the ground. Also, when the container 10 is pulled into transporting position on the vehicle, the assemblies should be retained in the retracted position so that they will not interfere with movement of the container on the vehicle.

The supporting leg assembly 16 is shown in the retracted position in FIGS. 4, 7, 8 and 9, and they are held in this position by means of a bolt 66 that passes through holes 68 in the sides 59 of the bracket 58, through holes 70 in the pair of leg members 42, and through a hole 72 in the leg member 56. Another bolt 74 passes through holes 76 in the sides 50 of the bracket 44, through holes 78 in the plates 48, and through a hole 80 in the leg member 56. In retracted position (FIG. 9), the leg member 56 fits into the cut-out portion 54 of the foot plate 52, and the upper part of the foot plate passes through a slotted cut out of the bracket 58 indicated at 82.

In order to put the supporting leg assembly 16 in the extended position, the bolts 66 and 74 are removed. The leg members 42 and 56 will then drop down and the pin 64 will engage the bottom part of the leg members 42 adjacent the foot plate 52. The pin 64 serves to prevent the free ends of leg members 42 and 56 from separating and also guides the leg members as they drop down. After the pin 64 engages the bottom part of the leg members 42 adjacent the foot plate 52, the holes 70 and 80 will be positively aligned. One of the bolts 66 or 74 may then be inserted through the holes 70 in the leg members 42 and the hole 80 in the leg member 56 so that the leg assembly 16 will become rigid and held in the extended position. In this way, the pins 64 greatly facilitate the connecting of the leg members 42 and 56.

In the extended position, the leg members 42 and 56 are not exactly perpendicular to the container 10, but rather are disposed thereto at an angle of less than 90 degrees, as shown in FIGS. 1, 2 and 5. This arrangement of the leg members provides the assembly 16 with suitable strength to resist the horizontal forces applied thereto as the container is tilted when it is moved onto or off of the transport vehicle 20.

The assemblies 16 may be extended by the operator when the container 10 is on the vehicle 20, but after it has been moved a short distance beyond the rear thereof, as shown in FIG. 3. When the container 10 is thereafter moved further to the rear and then off the vehicle 20, the leg assemblies 16 will engage the ground 10 and support the rear of the container in an elevated position, as shown in FIG. 2.

Although the drawings show leg assemblies on the rear corners only of the container, the front corners as well may be provided with such leg assemblies in order to support both ends, or the front end only, at an elevated position.

In FIGS. 12 and 13 there is illustrated a modified form of the invention wherein a single channel-shaped bracket 100 is employed to connect the rear pair of leg members 102 and the front leg member 104, to the container, the leg members 102 and 104 are pivotally connected to the bracket 100 in the same manner that leg members 42 and 56 are pivotally connected to the brackets 44 and 58. A foot plate 105 is fixed to the free end of the leg members 102.

The leg member 104 is provided at its free end with a stop pin 106 which engages a cross bar 108, fixed on the pair of leg members 102, when the legs are lowered. As described above with respect to FIG. 7, suitable pin members such as the pins 110 and 112 may be inserted through holes in the leg members 102 and 104 to retain the leg members in the folded position. When the leg members are extended, one of the pins, for example the pin 112, may be inserted through a hole provided in the bottom portion of the leg member 104 and in the mid-portion of the leg members 102 adjacent the bar 108.

The support leg assemblies 16 are of relatively simple construction yet they are suitably strong and can safely support the weight of the container 10 and the lading therein. The leg members may be made of tubular structure, if desired. When in the extended position, the leg members brace one another to resist the horizontal stresses applied thereto during the loading and unloading of the container. (See FIGS. 1 and 2.) Furthermore, even though the leg assemblies are strong and rigid, they can be retracted into a small space so as not to interfere with the movement of the container 10 on the transport vehicles. Additionally, if desired, the leg assemblies may be retracted so that the container can be placed on the ground without either end raised.

While the invention has been illustrated and described in certain embodiments, it is recognized that other variations and changes may be made therein without departing from the invention set forth in the claims.

We claim:

1. A container of the character described, comprising a body portion and a leg assembly in supporting relation therewith, said leg assembly comprising bracket means connected with the body portion at spaced points, a pair of upright leg members pivotally connected with the bracket means, a brace leg member pivotally connected with the bracket means on the body portion at a point spaced from the point of pivotal connection of the upright leg member and extending between the upright leg members in extended position, a cross bar fixed on the end portion of the brace leg member opposite from the pivotal connection, and a foot plate fixed to the lower end of the upright members and having a portion projecting laterally therefrom in the path of movement of the cross bar during relative swinging movement of the members for limiting said swinging movement.

2. A container of the character described comprising a body portion and a plurality of leg assemblies in supporting relation therewith, each leg assembly comprising spaced brackets secured to the container, a pair of upright members pivotally connected at one end with one bracket and extending downwardly therefrom in extended relation, a foot plate secured to the opposite end of the pair of members and having a portion projecting laterally therefrom, a brace member pivotally connected with another bracket and extending therefrom between the pair of members, a stop pin fixed on the end of the brace member on the opposite side of the pair of members from the last-mentioned pivotal connection and in position for engagement with the lateral projecting portion of the foot plate and in position to limit the swinging movement of the pair of leg members to less than 90° from a horizontal plane, a pin inserted through the crossed leg members in extended relation, said leg members being collapsible to a substantially flat relation in a common horizontal plane, and pins for extending through the leg members in collapsed relation.

References Cited in the file of this patent

UNITED STATES PATENTS

| | | |
|---|---|---|
| 1,985,169 | Howell et al. | Dec. 18, 1934 |
| 2,264,216 | Milligan | Nov. 25, 1941 |
| 2,606,676 | Dempster | Aug. 12, 1952 |
| 2,656,942 | Helms | Oct. 27, 1953 |
| 2,701,745 | Mackintosh | Feb. 8, 1955 |
| 2,745,566 | Bouffard | May 15, 1956 |
| 2,812,873 | Coleman | Nov. 12, 1957 |

FOREIGN PATENTS

| | | |
|---|---|---|
| 522,091 | Great Britain | June 7, 1940 |